United States Patent
Duo et al.

(10) Patent No.: US 9,071,993 B1
(45) Date of Patent: *Jun. 30, 2015

(54) CENTRALIZED WIRELESS LAN LOAD BALANCING

(75) Inventors: Zhuangzhi Duo, Milpitas, CA (US); Zhong Chen, Fremont, CA (US)

(73) Assignee: Dell Software Inc., Round Rock, TX (US)

( * ) Notice: Subject to any disclaimer, the term of this patent is extended or adjusted under 35 U.S.C. 154(b) by 597 days.

This patent is subject to a terminal disclaimer.

(21) Appl. No.: 12/333,132

(22) Filed: Dec. 11, 2008

Related U.S. Application Data (63) Continuation of application No. 11/056,525, filed on Feb. 10, 2005, now Pat. No. 7,480,264.

(51) Int. Cl.
| | | |
|---|---|---|
| *H04B 7/00* | (2006.01) | |
| *H04W 4/00* | (2009.01) | |
| *G06F 15/173* | (2006.01) | |
| *H04W 72/00* | (2009.01) | |
| *H04W 28/08* | (2009.01) | |

(52) U.S. Cl.
CPC .................................... *H04W 28/08* (2013.01)

(58) Field of Classification Search
None
See application file for complete search history.

(56) References Cited

U.S. PATENT DOCUMENTS

| | | | |
|---|---|---|---|
| 5,293,641 A * | 3/1994 | Kallin et al. ................. 455/453 |
| 5,732,077 A | 3/1998 | Whitehead | |
| 5,754,959 A | 5/1998 | Ueno et al. | |
| 5,796,722 A | 8/1998 | Kotzin et al. | |
| 5,852,778 A * | 12/1998 | Labedz ........................ 455/423 |
| 5,870,412 A * | 2/1999 | Schuster et al. ............. 714/752 |
| 5,898,681 A | 4/1999 | Dutta | |
| 5,978,359 A * | 11/1999 | Caldara et al. ............... 370/236 |
| 6,052,587 A * | 4/2000 | Moraes et al. ............... 455/430 |
| 6,073,025 A | 6/2000 | Chheda et al. | |
| 6,167,031 A * | 12/2000 | Olofsson et al. ............. 370/252 |
| 6,208,644 B1 | 3/2001 | Pannell et al. | |
| 6,385,449 B2 * | 5/2002 | Eriksson et al. ............. 455/436 |
| 6,522,881 B1 * | 2/2003 | Feder et al. .................. 455/437 |
| 6,574,474 B1 | 6/2003 | Nielsen | |
| 6,574,477 B1 | 6/2003 | Rathunde | |
| 6,581,104 B1 | 6/2003 | Bereiter | |
| 6,590,861 B1 * | 7/2003 | Vepa et al. .................... 370/216 |
| 6,650,621 B1 | 11/2003 | Maki-Kullas | |
| 6,667,975 B1 | 12/2003 | DeJager et al. | |
| 6,701,150 B1 | 3/2004 | Huang et al. | |
| 6,711,159 B1 | 3/2004 | Grabelsky et al. | |

(Continued)

OTHER PUBLICATIONS

Shue et al. (Dynamic Load Balance Algorithm for IEEE 802.11 Wireless LAN).*

(Continued)

*Primary Examiner* — Marsha D Banks Harold
*Assistant Examiner* — Christopher Wyllie
(74) *Attorney, Agent, or Firm* — Lewis Roca Rothgerber LLP (57) ABSTRACT

A centralized wireless LAN load balancing mechanism is described herein. In one embodiment, in response to a request for entering a wireless network from a wireless station and forwarded from multiple access points (APs) of the wireless network, a network access device coupled to the multiple APs determines a load for each of the APs. The network access device then selects one of the APs based on the determined loads of the APs and instructs the selected AP to associate with the wireless station. The network access device further instructs the remaining APs to reject the request. Other methods and apparatuses are also described.

14 Claims, 9 Drawing Sheets

(56) References Cited

U.S. PATENT DOCUMENTS

| | | | |
|---|---|---|---|
| 6,717,950 | B2 | 4/2004 | Lui et al. |
| 6,728,961 | B1 | 4/2004 | Velasco |
| 6,788,692 | B1* | 9/2004 | Boudreau et al. ............. 370/400 |
| 6,789,125 | B1 | 9/2004 | Aviani et al. |
| 6,799,210 | B1 | 9/2004 | Gentry et al. |
| 6,810,018 | B2 | 10/2004 | Paranchych et al. |
| 7,197,025 | B2* | 3/2007 | Chuah ........................... 370/338 |
| 7,215,661 | B2 | 5/2007 | Backes et al. |
| 7,403,780 | B2* | 7/2008 | VanLaningham et al. . 455/452.1 |
| 7,480,264 | B1* | 1/2009 | Duo et al. .................. 370/310.2 |
| 2001/0015963 | A1 | 8/2001 | Tuomainen et al. |
| 2002/0082012 | A1* | 6/2002 | Wang et al. .................. 455/435 |
| 2002/0102941 | A1* | 8/2002 | Kuiri et al. ...................... 455/63 |
| 2002/0110105 | A1* | 8/2002 | Awater et al. ................ 370/338 |
| 2002/0141375 | A1* | 10/2002 | Choi ............................ 370/347 |
| 2003/0050068 | A1 | 3/2003 | Woxberg et al. |
| 2003/0134642 | A1 | 7/2003 | Kostic et al. |
| 2003/0139197 | A1* | 7/2003 | Kostic et al. .................. 455/525 |
| 2003/0214928 | A1* | 11/2003 | Chuah ........................... 370/336 |
| 2004/0053624 | A1 | 3/2004 | Frank et al. |
| 2004/0063455 | A1* | 4/2004 | Eran et al. ..................... 455/525 |
| 2004/0098586 | A1 | 5/2004 | Rebo et al. |
| 2004/0105416 | A1* | 6/2004 | Rue .............................. 370/338 |
| 2004/0121749 | A1 | 6/2004 | Cui et al. |
| 2004/0141522 | A1* | 7/2004 | Texerman et al. ............ 370/466 |
| 2004/0142691 | A1 | 7/2004 | Jollota et al. |
| 2004/0203904 | A1* | 10/2004 | Gwon et al. ................ 455/456.1 |
| 2004/0246922 | A1 | 12/2004 | Ruan et al. |
| 2005/0113030 | A1* | 5/2005 | Gaikwad et al. ........... 455/67.11 |
| 2005/0197136 | A1* | 9/2005 | Friday et al. ................ 455/456.1 |
| 2006/0030270 | A1* | 2/2006 | Cheng ........................ 455/67.11 |
| 2006/0089122 | A1* | 4/2006 | Zavalkovsky et al. ........ 455/410 |
| 2007/0171872 | A1* | 7/2007 | Jollota et al. .................. 370/331 |
| 2009/0175207 | A1* | 7/2009 | Stephenson et al. .......... 370/311 |
| 2014/0086215 | A1* | 3/2014 | Duo et al. ..................... 370/332 |

OTHER PUBLICATIONS

Sheu, et al., "Dynamic Load Balance Algorithm (DLBA) for IEEE 802.11 Wireless LAN", Tamkang Journal of Science and Engineering, vol. 2, No. 1, pp. 45-52.

Papanikos, et al., "A Study on Dynamic Load Balance for IEEE 802.11b Wireless LAN", Jun. 2001, 7 pgs.

U.S. Appl. No. 11/056,525; Office Action mailed Jul. 24, 2008.

U.S. Appl. No. 11/056,525; Final Office Action mailed May 28, 2008.

U.S. Appl. No. 11/056,525; Office Action mailed Nov. 28, 2007.

\* cited by examiner

| Access Point ID (e.g., MAC) 301 | Number of wireless stations associated with 302 | RSSI 303 | FER 304 | Weight 305 |
|---|---|---|---|---|
| AP 1 | | | | |
| AP2 | | | | |
| ... | ... | ... | ... | ... |
| AP N | | | | |

| Order | Information | Notes |
|---|---|---|
| 1 | Timestamp | |
| 2 | Beacon interval | |
| 3 | Capability information | |
| 4 | SSID | |
| 5 | Supported rates | |
| 6 | FH Parameter Set | The FH Parameter Set information element is present within Probe Response frames generated by STAs using frequency-hopping PHYs. |
| 7 | DS Parameter Set | The DS Parameter Set information element is present within Probe Response frames generated by STAs using direct sequence PHYs. |
| 8 | CF Parameter Set | The CF Parameter Set information element is only present within Probe Response frames generated by APs supporting a PCF. |
| 9 | IBSS Parameter Set | The IBSS Parameter Set information element is only present within Probe Response frames generated by STAs in an IBSS. |

```
┌─────────────────────────────────────────────────────────┐
│ A MOBILE DEVICE WIRELESSLY BROADCASTS A REQUEST FOR     │
│ ENTERING A WIRELESS NETWORK (E.G., WLAN) TO MULTIPLE    │
│         ACCESS POINTS OF THE WIRELESS NETWORK.          │
│                          601                            │
└─────────────────────────────────────────────────────────┘
                             │
                             ▼
┌─────────────────────────────────────────────────────────┐
│ IN RESPONSE TO THE REQUEST, EACH ACCESS POINT TRANSMITS A│
│  FIRST MESSAGE TO A NETWORK ACCESS DEVICE INTERFACING THE│
│  WIRELESS NETWORK WITH ANOTHER NETWORK (E.G., WAN), WHERE│
│  THE FIRST MESSAGE INCLUDES LOAD STATUS OF THE RESPECTIVE│
│                      ACCESS POINT.                       │
│                          602                             │
└─────────────────────────────────────────────────────────┘
                             │
                             ▼
┌─────────────────────────────────────────────────────────┐
│ IN RESPONSE TO THE FIRST MESSAGE FROM EACH ACCESS POINT, │
│  THE NETWORK ACCESS DEVICE SELECTS ONE OF THE ACCESS     │
│  POINTS BASED ON A PREDETERMINED FORMULA, USING IN PART  │
│         THE LOAD STATUS OF EACH ACCESS POINT.            │
│                          603                             │
└─────────────────────────────────────────────────────────┘
                             │
                             ▼
┌─────────────────────────────────────────────────────────┐
│ THE NETWORK ACCESS DEVICE TRANSMITS A SECOND MESSAGE TO  │
│  THE SELECTED ACCESS POINT TO ENABLE THE SELECTED ACCESS │
│        POINT TO ASSOCIATE WITH THE MOBILE DEVICE.        │
│                          604                             │
└─────────────────────────────────────────────────────────┘
                             │
                             ▼
┌─────────────────────────────────────────────────────────┐
│ THE NETWORK ACCESS DEVICE TRANSMITS A THIRD MESSAGE TO   │
│  THE REMAINING ACCESS POINTS TO ENABLE THE REMAINING     │
│ ACCESS POINTS TO REJECT THE REQUEST OF THE MOBILE DEVICE.│
│                          605                             │
└─────────────────────────────────────────────────────────┘
```

CENTRALIZED WIRELESS LAN LOAD BALANCING

RELATED APPLICATION

This is a continuation application of U.S. patent application Ser. No. 11/056,525, now U.S. Pat. No. 7,480,264, filed Feb. 10, 2005, which is hereby incorporated by reference.

FIELD OF THE INVENTION

The present invention relates generally to wireless networks. More particularly, this invention relates to centralized wireless LAN load balancing.

BACKGROUND OF THE INVENTION

Wireless communication networks for providing links to mobile stations are well known in the art. In one type of wireless network, a series of access points provide wireless connections to various mobile users. For example, a building can include access points located at strategic locations to serve mobile users as they move throughout the building. The mobile users migrate from access point to access point based upon the strength of beacon signals from the various access points. That is, the mobile stations use the strength of the beacon signals to select the best access point at a given point in time.

With changes in the channel environment and/or number of users in a wireless local area network (WLAN) system, different access points experience different traffic loading. That is, the number of users served by each of the access points varies over time. Those access points that serve a relatively high number of stations (hot spots) can become overloaded and experience reduced performance. For example, an access point can become overloaded during a meeting in a conference room proximate the access point when the attendees attempt to connect their laptops to the corporate intranet.

When a mobile station entering a WLAN (e.g., via association or re-association), the mobile station broadcast a message in the WLAN (e.g., probe request) to some of all of the access points of the WLAN). In response each of the access points (APs) responds to the mobile station. Thereafter, the mobile station selects one of the access points to associate with based on the responses received from each of the access points (e.g., received signal strength indication or RSSI). However, when the mobile station selects an access point, the traffic load of the access point being associated and other access points may not be taken into consideration. As a result, the selected access point may not be the most appropriate one (e.g., having the least traffic load).

SUMMARY OF THE INVENTION

A centralized wireless LAN load balancing mechanism is described herein. In one embodiment, in response to a request for entering a wireless network from a wireless station and forwarded from multiple access points (APs) of the wireless network, a network access device coupled to the multiple APs determines a load for each of the APs. The network access device then selects one of the APs based on the determined loads of the APs and instructs the selected AP to associate with the wireless station. The network access device further instructs the remaining APs to reject the request.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

A centralized wireless LAN load balancing mechanism is described herein. In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Throughout this application, for the purposes of illustration, a wireless local area network (WLAN) with IEEE 802.11 protocol is used as an example to demonstrate embodiments of the invention. However, embodiments of the invention are not limited to the WLAN and/or IEEE 802.11 protocol, other types of wireless network and/or wireless protocols may also be applied.

According to one embodiment, multiple access points (APs) governed by a network access device (e.g., gateway, switch, router, etc.) can be deployed in substantially the same region with substantially the same SSID (service set identifier) and security settings to provide larger coverage and wireless client station (WS) roaming support. A centralized dynamic load balance control protocol is utilized between the network access device and some or all of these APs to control association of WS to balance the load of each AP. In this way, the quality of service (QoS) of overall network and efficient WS roaming, as well as a good performance improvement feature for distributed WLAN network, can be achieved.

According to one embodiment, factors that affect the QoS of distributed WLAN network may be taken into account to determine each AP's load, which may be represented as weights determined via a predetermined formula, also referred to as a WLAN dynamic load balance algorithm (WLBA). In addition, a WLAN dynamic load balance control protocol (WLBP) between a network access device and each governed AP to exchange data and management packets. As a result, the network access device can collect all QoS data from APs and compute the weight for each AP based on the WLBA to determine which AP is the appropriate one to accept the association from WS. The WLBA and/or WLBP may also be used in disassociation and/or re-association situations.

Once the network access device determines the appropriate AP, according to one embodiment, the network access device then issues one or more management packets to a selected AP to direct WS to join the dedicated AP through WLBP protocol. In this way, the load of AP including number of associated WS, throughput, and frame error rate (FER) can be balanced properly, and the entire network performance can be improved from anticipated WS symmetry associations. Furthermore, the network access device can provision the weight threshold to detect WS roaming and direct WS to join the new AP with less handoff delay.

Typically, the association service is used to make a logical connection between a mobile station and an access point. Each mobile station has to become associated with an access point before it is allowed to send or receive data through the access point over the network. The connection is necessary in order for the network to know where and how to deliver data to the mobile station. The mobile station invokes the association service once and only once, typically when the mobile station enters the network. Each mobile station can associate with one access point though an access point can associate with multiple stations.

The disassociation service is used either to force a mobile station to eliminate an association with an access point or for a mobile station to inform an access point that it no longer requires the services of the network. When a mobile station becomes disassociated, it may begin a new association to communicate with another access point again. An access point may force a mobile station or stations to disassociate because of resource restraints (e.g., the access point is shutting down or being removed from the network for a variety of reasons). When a mobile station is aware that it will no longer require the services of an access point, it may invoke the disassociation service to notify the access point that the logical connection to the services of the access point from this mobile station is no longer required. Mobile stations should disassociate when they leave a network. Disassociation is a notification and can be invoked by either associated party. Neither party can refuse termination of the association.

Re-association enables a mobile station to change its current association with an access point. The re-association service is similar to the association service, with the exception that it includes information about the access point with which a mobile station has been previously associated. A mobile station will use the re-association service repeatedly as it moves throughout the coverage areas of multiple access points of a wireless network, loses contact with the access point with which it is associated, and needs to become associated with a new access point. By using the re-association service, a mobile station provides information to the access point to which it will be associated and information pertaining to the access point which it will be disassociated. This allows the newly associated access point to contact the previously associated access point to obtain frames that may be waiting there for delivery to the mobile station as well as other information that may be relevant to the new association.

Figure 1:
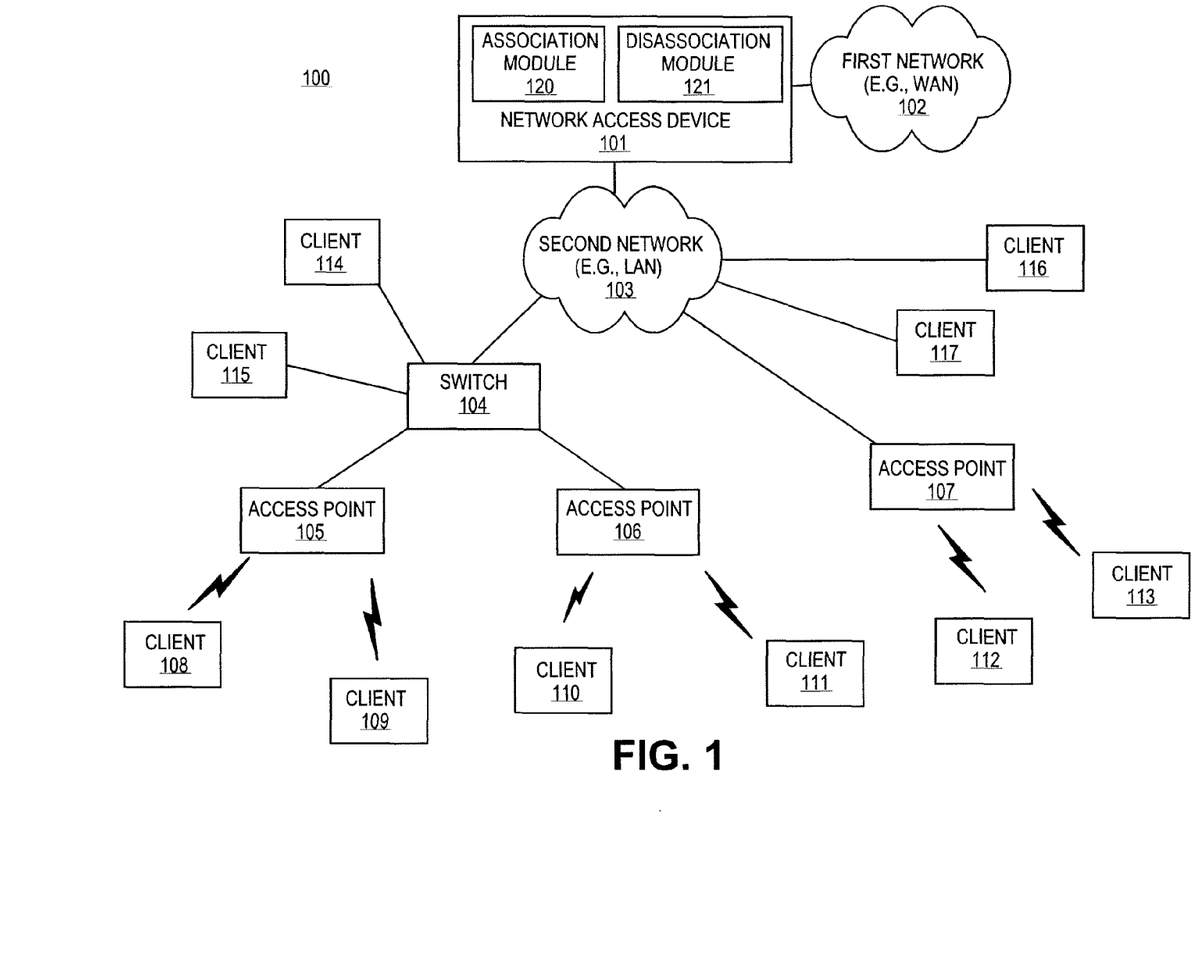
FIG. 1 is a block diagram illustrating an exemplary network configuration according to one embodiment.

FIG. 1 is a block diagram illustrating an exemplary network configuration according to one embodiment. In one embodiment, exemplary network configuration 100 includes a network access device 101 for interfacing a first network 102 and a second network 103. For example, the first network 102 may be an external network or a wide area network (WAN) such as Internet. The second network 103 may be an internal network, such as, for example, a local area network (LAN) or an intranet of an organization.

The network access device 101 may be a gateway device, a switch or router, a modem (e.g., DSL or cable modem), or a combination of at least two of these functionalities. In one embodiment, the network access device 101 may be coupled to one or more access points (also referred to as repeaters), such as access points 105 to 107. Access points 105 to 107 may be wireless communication devices capable of receiving and transmitting data wirelessly with one or more mobile stations, such as mobile clients 108-113. A mobile station may be able to wirelessly communicate with more than one access point. For example, mobile client 109 may be able to communicate with access points 105 and 106. However, a mobile station typically can only be associated with one access point at a time in order to access the wireless network.

An access point, such as access point 107, may be directly coupled to the network access device 101. Alternatively, an access point, such as access points 105-106, may be coupled to the network access device 101 via a switch, a router, or a hub device 104. Furthermore, an access point may be integrated within a switch (e.g., switch 104), a network access device (e.g., network access device 101), or a combination of both.

A mobile client (e.g., mobile clients 108-113) may be a laptop or desktop computer having a wireless interface, such as, for example, a wireless Ethernet NIC (network interface card), an IEEE 802.11 compatible device, or the like. Alternatively, a mobile client may be a cellular phone, a wireless PDA (personal digital assistant), a pager, a portable gaming device, or a personal communicator (e.g., similar to a Blackberry compatible device), etc.

In addition to the wireless functionality, exemplary network configuration 100 may include one or more wired clients (e.g., wired desktop or laptop computers) communicatively coupled to the network access device 101, either directly or via a switch or a hub device (e.g., switch 104). Furthermore, one or more servers such as, for example, application servers (not shown), may be coupled to the LAN 103 to provide local services to some or all clients 108-117.

According to one embodiment, the network access device 101 includes an association module 120 and a disassociation module 121 to provide association, disassociation, and/or re-association services to any of the clients 108-117 with respect to any of the access points 105-107 with load balancing. For example, according to one embodiment, when a mobile station, such as, for example, mobile client 110 attempts to enter the WLAN (e.g., via association or re-association), the mobile client 110 sends a broadcast message to some or all of the access points 105-107 of the WLAN for requesting entering the WLAN.

In one embodiment, each broadcast message to each access point may include an indication of received signal strength between the mobile client and the respective access point. For example, in an IEEE 802.11 compatible environment, the broadcast message may be an IEEE 802.11 compatible probe request, which includes an RSSI (received signal strength indicator) between the mobile client and an access point. Alternatively, each of the access points that receive the broadcast message may determine the received signal strength. Furthermore, the received signal strength may be determined by both the mobile station and the access point.

In response to the broadcast message, each of the access points 105-107 transmits a first message to the network access device 101. The first message may be transmitted via a proprietary protocol, such as a wireless load balancing protocol (WLBP), which will be described in details further below. The first message may be transmitted via a tunneling protocol (e.g., layer 2 or layer 3 tunneling protocols). In one embodiment, the first message may include load status with respect to each respective access point. In a particular embodiment, the first message includes a number of mobile clients currently associated by the respective access point, the RSSI between the mobile client and the respective access point, and/or an error rate (e.g., frame error rate or FER) of the respective access point, which may represent a throughput of the respective access point.

In response to the first message received from each of the access points 105-107, the network access device 101 calculates the load for each of the access points 105-107 based on the information received via the first message. Thereafter, the network access device 101 selects one of the access points having a load that satisfies one or more predetermined categories to associate with the mobile client, while the remaining access points are instructed to reject the request of the mobile client.

In one embodiment, for each of the access points, the network access device 101 calculates a weight representing the load situation of the respective access point according to a predetermined formula based on the load status of the first message received from the respective access point, which will be described in details further below. Once the network access device 101 selects one access point that satisfies the one or more predetermined categories (e.g., having the highest or lowest weight), the network access device 101 sends a second message to the selected access point to instruct the selected access point to accept the request of the mobile client. The network access device 101 further sends a third message to remaining access points to reject the request of the mobile client.

In response to the second message, the selected access point responds to the mobile client to accept the request and establishes an association with the mobile client. In response to the third message, the remaining access points responds to the mobile client by rejecting the request. As a result, only the selected access point accepts the request from the mobile client and the selected access point is selected by the network access device in consideration the load status of some or all of the access points, which leads to load balancing centralized by the network access device.

Figure 2:
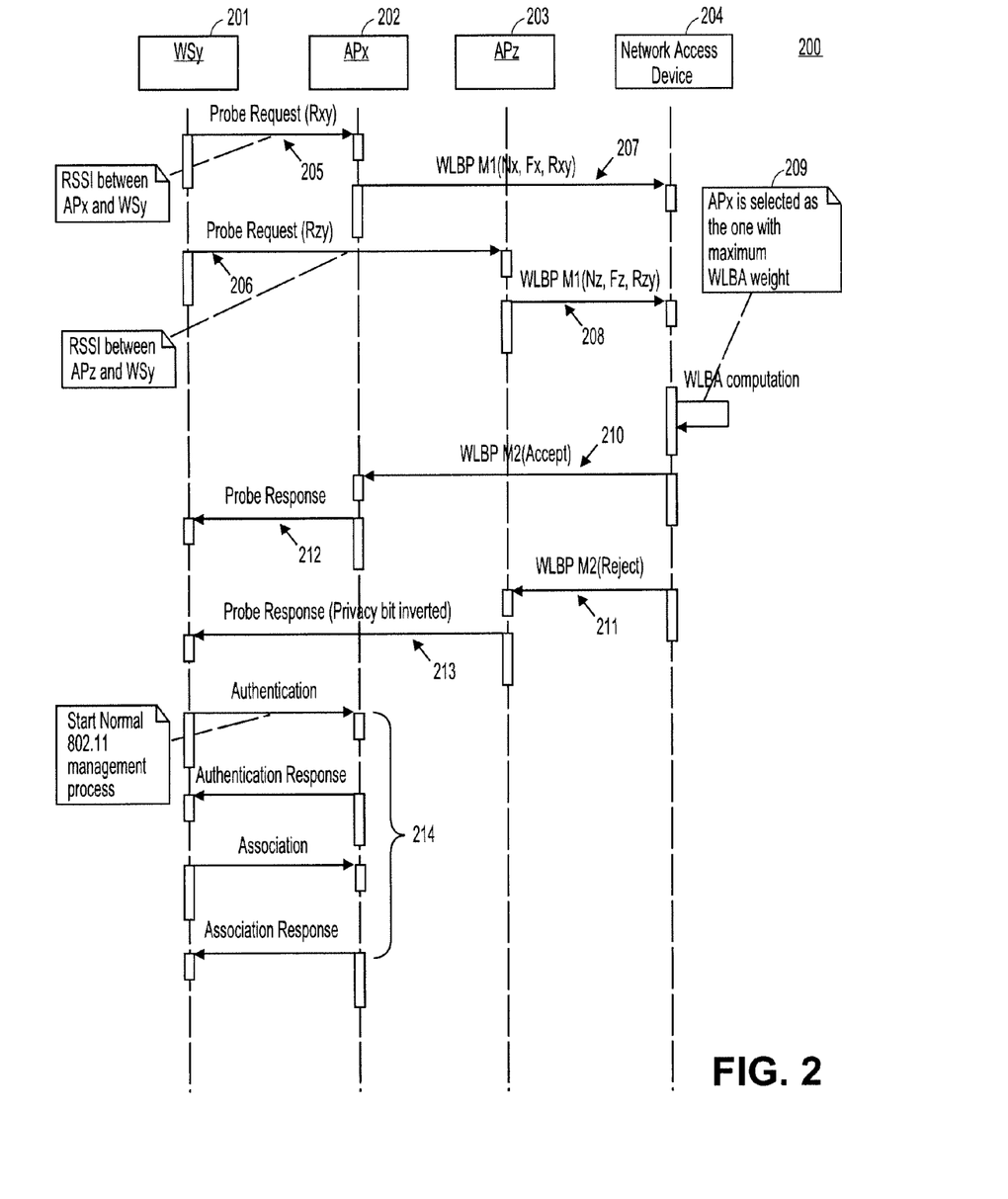
FIG. 2 is a flow diagram illustrating an exemplary process for associating a mobile client with an access point with load balancing, according to one embodiment.

FIG. 2 is a flow diagram illustrating an exemplary process for associating a mobile client with an access point with load balancing, according to one embodiment. The exemplary process 200 may be performed by processing logic that may include hardware (e.g., circuitry, dedicated logic, etc.), software (such as is run on a general-purpose computer system, a server, a router, or a dedicated machine), or a combination of both.

In this example, for the illustration purposes, it is assumed that there are two IEEE 802.11 compatible access points 202-203 communicatively coupled to a network access device 204 via an IEEE 802.11 compatible protocol. However, it is not so limited. The exemplary process 200 may be applied to other wireless network configurations with other wireless protocols. In one embodiment, the access points 202-203 may be implemented as any of the access points 105-107 of FIG. 1, while the network access device 204 may be implemented as a part of network access device 101 of FIG. 1. Similarly, client 201 may be implemented as any of mobile clients 108-113 of FIG. 1.

Referring to FIG. 2, according to one embodiment, when client 201 wishes to enter the WLAN having access points 202-203 and a network access device 204 interfacing the WLAN with another network (e.g., WAN or Internet), during operations 205-206, client 201 broadcasts a request message, similar to an IEEE 802.11 compatible probe request, to access points 202-203. The probe request may include an RSSI between client 201 and access points 202-203 respectively. Alternatively, the RSSI may be determined by the access points 202-203, or a combination of both a mobile station and an access point.

In response to the probe request, during operations 207-208, which may be substantially concurrently or sequentially, each of the access points 202-203 transmits a first message to the network access device 204. The first message may be transmitted via a proprietary protocol or a tunneling protocol, such as, for example, a WLBP. In one embodiment, the first message from each of the access points 202-203 includes load status regarding the respective access point. In a particular embodiment, the load status includes a number of mobile clients currently associated with the respective access point, an RSSI between the requesting mobile client and the respective access point, and/or an error rate of the respective access point (e.g., a frame error rate or FER).

In response to the first message received from the access points 202-203, during operation 209, the network access device 204 calculates a load for each of the access points 202-203 according to a predetermined formula, also referred to as a WLAN dynamic load balance algorithm (WLBA), based in part on the load status extracted from the first message. In one embodiment, the load of an access point is represented by a weight calculated based on at least one of the number of mobile clients currently associated with the respective access point, an RSSI between the requesting mobile client and the respective access point, and/or an FER of the respective access point, which may be provided via the first message.

According to one embodiment, based on the weight corresponding to each of the access points 202-203, the network access device 204 selects one access point having a weight that satisfies one or more predetermined categories (e.g., highest or lowest weight). In this example, access point 202 is selected based on the weight associated with access point 202. The network access device 204 then sends a second message during the operation 210 to access point 202 to accept the request, while sending a third message during operation 211 to access point 203 (e.g., unselected access point) to reject the request.

In one embodiment, an example of the predetermined formula may be defined as follows:

$$Wx = Vx * Qx * Fx$$

Where Wx denotes the weight of APx 202. Vx denotes a variance of mean RSSI with and without WSy 201 taken into account for APx 202. Qx denotes a quota of mean RSSI in maximum RSSI for APx 202. Fx denotes the frame error rate of APx 202.

In one embodiment, Vx may be determined as follows:

$$Vx = Mx' - Mx$$

Where Mx denotes the mean RSSI without WSy taken into account, while Mx' denotes the mean RSSI with WSy taken into account. In one embodiment, Mx may be determined as follows:

$$Mx = \sum_{i=1}^{Nx} Rxi/Nx$$

and Mx' may be determined as follows:

$$Mx' = \left(\sum_{i=1}^{Nx} Rxi + Rxy\right) / (Nx+1)$$

Where Nx denotes a number of wireless stations associated with APx 202. Rxi denotes the RSSI value between APx 202 and associated WSi. In one embodiment, Qx=1+Mx'/Rmax, if Vx≥0 and Qx=1−Mx'/Rmax, if Vx<0, where Rmax demotes a maximum RSSI value that the AP can measure from the link. When Vx≥0, it indicates that WSy 201 joining APx 202 will have a positive RSSI contribution to the APx 202. When Vx<0, it indicates that WSy 201 joining APx 202 will have a negative RSSI effect to the APx 202.

Figure 3:
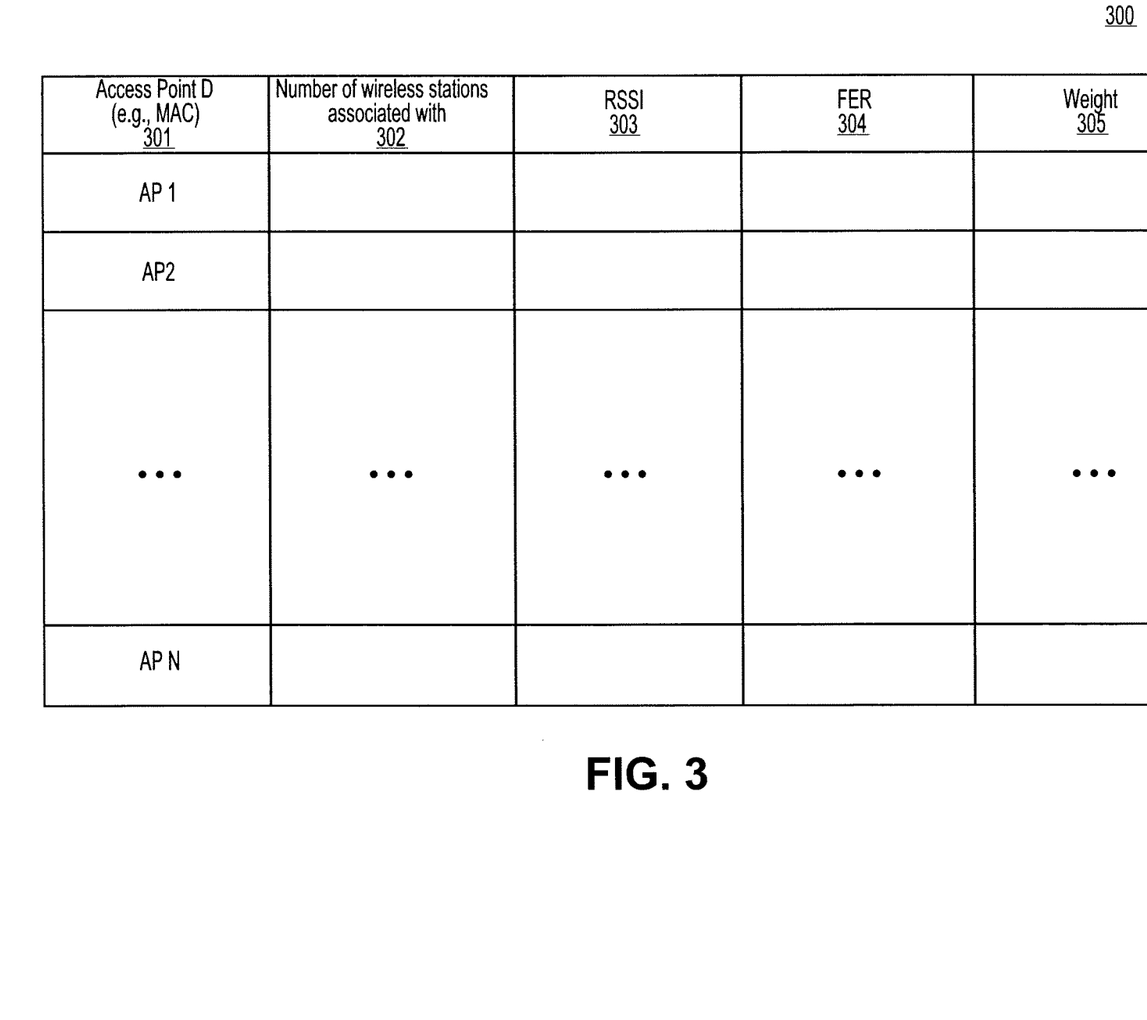
FIG. 3 is a block diagram illustrating an exemplary database configuration according to one embodiment.

In one embodiment, the network access device 204 may maintain a database for purposes of selecting an access point based on the calculated weight representing the load of the access points. FIG. 3 is a block diagram illustrating an exemplary database configuration according to one embodiment. Referring to FIG. 3, for each mobile client requesting for entering a WLAN, exemplary table 300 may be maintained by a network access device, either statically or dynamically.

Referring to FIG. 3, exemplary table 300 includes an access point ID field for identifying all of the access points that receive signals from the requesting mobile client. For example, an access point may be identified by its MAC (media access control) address. Exemplary table 300 further includes field 302 to store a number of mobile clients currently associated with each access point identified via field 301. Field 303 may be used to store an RSSI between the requesting mobile client and each of the access points. FER field 304 may be used to store the FER of each access point. The information stored in fields 302-304 may be received by the network access device from each access point via a message according to a WLBP protocol (e.g., messages 207-208 of FIG. 2). Weight field 305 may be used to store a result of a weight calculation according to a predetermined formula such as the one described above. Based on the weight information of each access points identified by field 301, the network access device may select one access point having a weight satisfying one or more predetermined categories. In a particular embodiment, an access point having the highest weight may be selected to associate with the requesting mobile client.

Note that the exemplary table 300 is described and shown for the illustration purposes only. Exemplary table 300 may also include other information. For example, exemplary table 300 may further include an RSSI threshold field to indicate that when an RSSI of a mobile client drops below a threshold indicated by a value stored in the RSSI threshold field, the network access device may notify the associated access point to disassociate with that mobile client. The disassociated mobile client may then re-associate with another access point using one of the techniques described above to achieve load balancing purposes. Other configurations may exist.

Referring back to FIG. 2, in response to the second message received during operation 210, the access point 202 responds to the probe request received via operation 205 by sending a probe response via operation 212 to the requesting mobile client 201 to accept the request. Meanwhile, in response to the third message received during operation 211, access point 203 responds to the probe request received via operation 206 by sending a probe response via operation 213 to the requesting mobile client 201 to reject the request. In one particular embodiment, the probe response message rejecting the request includes one or more predetermined bits inverted with respect to the probe response message accepting the request.

Figure 4A:
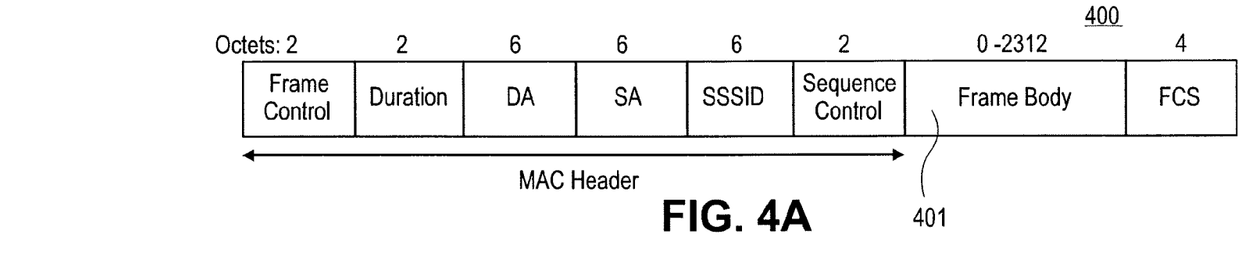
FIGS. 4A-4C are block diagrams illustrating typical IEEE 802.11 probe response packets.
Figure 4B:
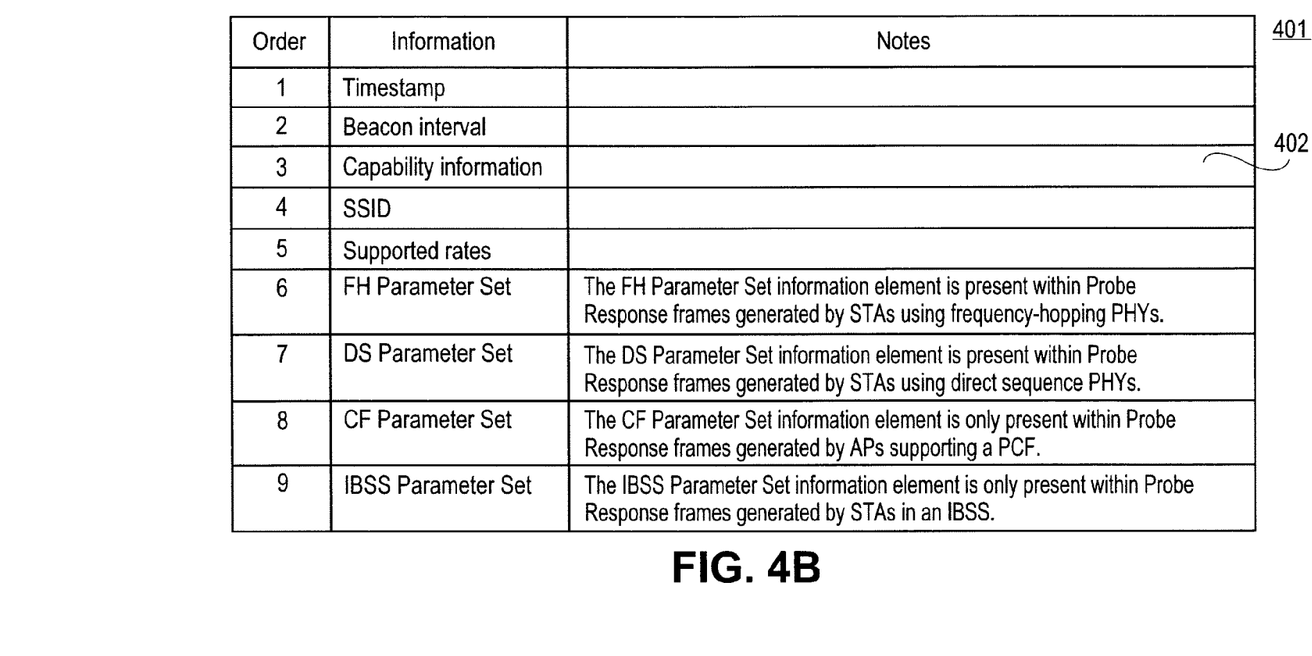
Figure 4C:
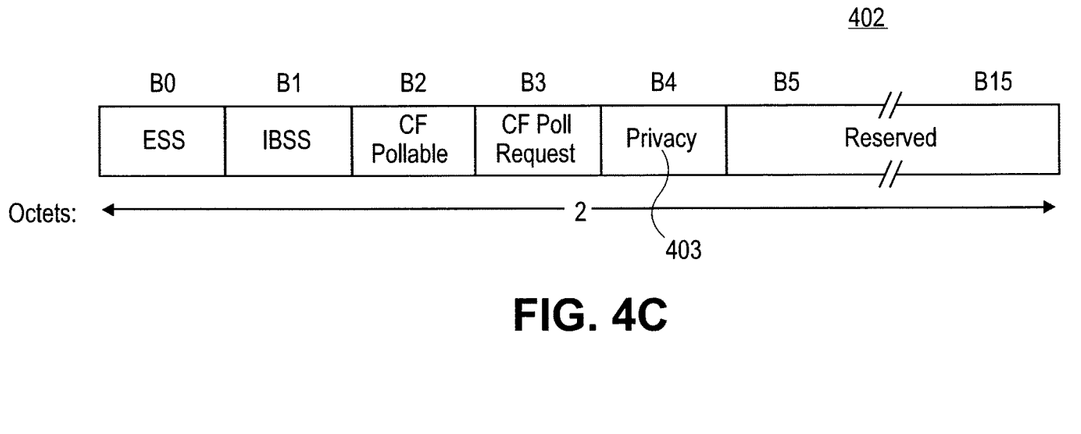

In this example, the probe response message may be an IEEE 802.11 compatible probe response, similar to the IEEE 802.11 probe response frame as shown in FIGS. 4A-4C. Referring to FIGS. 4A-4C, a typical IEEE 802.11 management frame 800 includes, among others, a frame body 401. Within the frame body 401, there is a capability information field 402 indicating the capability of the respective access point. Within the capability information field 402, there is a privacy field 403 that is normally matched with the one set within a mobile client associated with the access point.

For an access point in a typical system such as a system having an open system authentication setting, the privacy bit 403 in a probe response frame is normally set to zero. For an access point with privacy-enabled authentication setting such as shared key authentication or WiFi protected access (WPA) authentication, the privacy bit 403 may be set to one. If a wireless station determines that the privacy bit in a probe response does not match the authentication setting of its own, wireless station will stop association process. Therefore in WLBP, only the dedicated AP, which is selected by the network access device, has the matched privacy bit with the wireless station, and all other APs have the inverted privacy bit. As a result, the wireless station will be directed to join the dedicated AP accordingly.

Referring back to FIG. 2, in response to the probe response received from access point 202 via operation 212, the wireless station 201 may proceed to perform normal association processes 214 with access point 202. Other operations may also be performed.

Figure 5A:
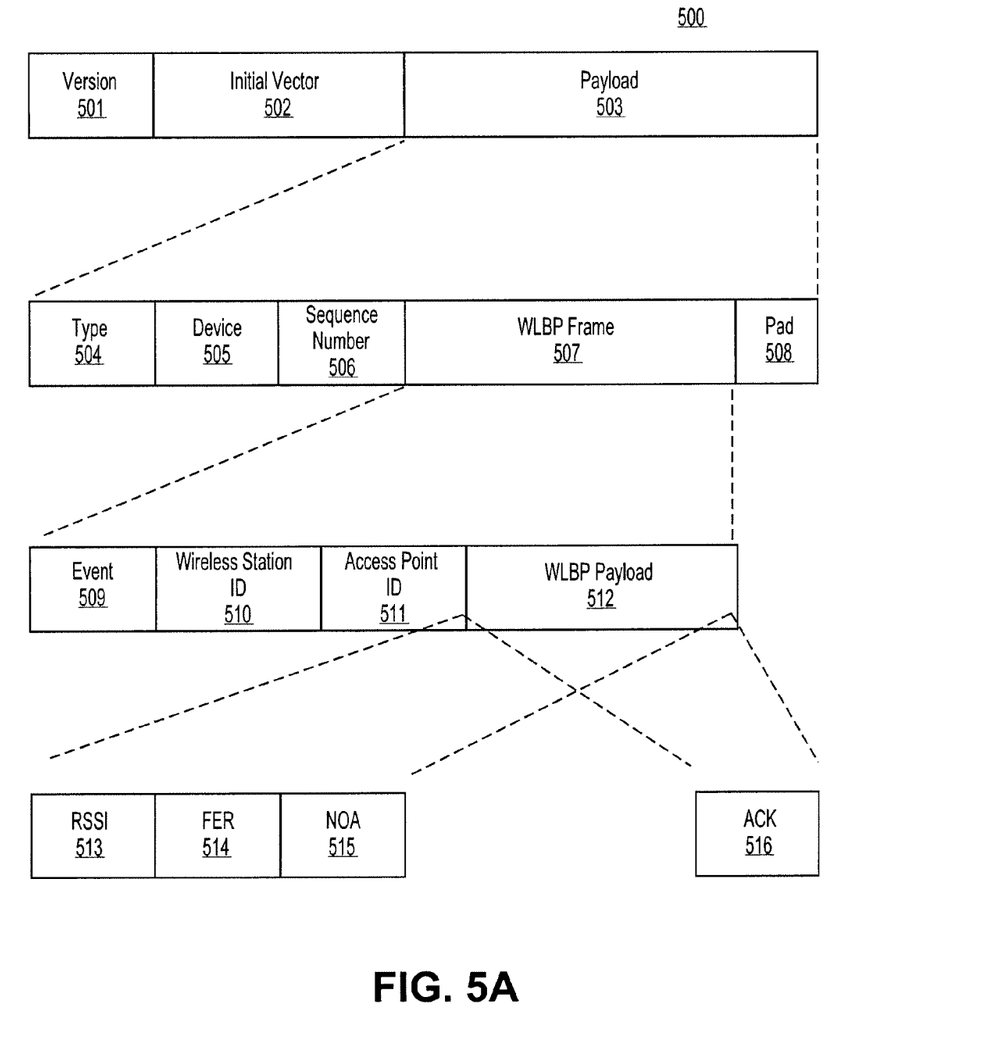
FIGS. 5A and 5B are block diagrams illustrating an exemplary WLBP packet according to certain embodiments.
Figure 5B:
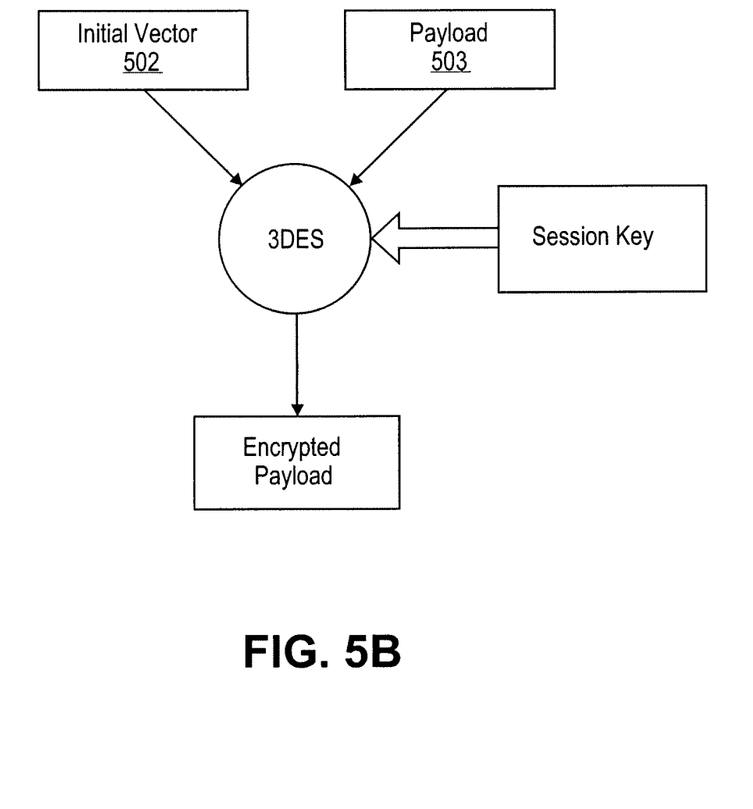

As described above, according to one embodiment, the first messages 207-208, the second message 210, and the third message 211 may be transmitted according to a proprietary protocol WLBP. FIGS. 5A and 5B are block diagrams illustrating an exemplary WLBP packet according to certain embodiments. Referring to FIG. 5A, exemplary packet 500 includes a version field 501, an initial vector field 502, and a payload field 503. The version field 501 may be used to indicate a version of the WLBP. In one embodiment, the version field 501 has a size of 1 octet (e.g., 8 bits), which may be referred to as one byte in certain types of computer systems. The initial vector field 502 may be used to store an initial vector for encrypting the payload stored in the payload field 503. In one embodiment, the initial vector field 502 includes 6 octets.

In one embodiment, the payload field 503 includes a type field 504, a device field 505, a sequence number field 506, a WLBP frame 507, and a pad field 508. The type field 504 may be used to indicate a frame type and may have a size of 1 octet according to one embodiment. The sequence number field 506 may have a size of 4 octets. The configurations of the WLBP frame 507 and pad field 508 may depend on whether the respective packet is transmitted from an access point to a network access device or from the network access device to an access point.

According to one embodiment, the WLBP frame 507 includes an event field 509, a wireless station ID field 510, an access point ID field 511, and a WLBP payload field 512. The event field 509 may be used to indicate whether the respective packet is being transmitted from an access point to a network access device or vice versa. In one embodiment, the event field 509 has a size of 1 octet. The wireless station ID field 510 and the access point ID field 511 may be used to identify the requesting wireless station and the respective access point respectively. In one embodiment, a MAC address of the wireless station and the access point may be used as an ID stored in fields 510 and 511 respectively. In one embodiment, the wireless station ID field 510 and the access point ID field each has a size of 6 octets.

The WLBP payload field 512 may be used to store the payload of the WLBP packet. The size of the payload field 512 depends on the type of the packet indicated by the event field 509. According to one embodiment, when the event field 509 indicates that the respective packet is being transmitted from an access point to a network access device, the WLBP payload 512 includes an RSSI field 513, an FER field 514, and an NOA (number of associated wireless station) field 515 for respectively storing the RSSI, FER, and a number of wireless station currently associated with the access point. In a particular embodiment, each of the fields 513-515 has a size of 4 octets.

According to an alternative embodiment, when the event field 509 indicates that the packet is being transmitted from the network access device to an access point, the WLBP payload field 512 includes an acknowledgement field 516 to allow the network access device indicating whether the access point receiving the packet should accept or reject the request from wireless station. In a particular embodiment, the acknowledgement field 516 has a size of 1 octet.

According to one embodiment, the size of the pad field 508 depends on the type of the WLBP payload 512 indicated by the event field 509. In a particular embodiment, when the event field 509 indicates that the packet is being transmitted from an access point to a network access device, the pad field 508 has a size of 1 octet. Otherwise, if the packet is being transmitted from the network access device to an access point, the pad field 508 has a size of 4 octets. One of the purposes of the pad field 508 is to pad the packet conforming to certain memory access boundaries (e.g., 4 bytes or 8 bytes boundary).

According to one embodiment, the payload 503 may be encrypted to prevent from eavesdropping. In one embodiment, the payload 503 may be encrypted using an initial vector stored in the vector field 502. In a particular embodiment, the payload 503 may be encrypted using a 3DES (triple data encryption standard) compatible algorithm as shown in FIG. 5B.

Note that the packet configurations as shown in FIG. 5A are illustrated as an example only. It will be appreciated that various types of the fields, the number of the fields, the sizes of the fields, and/or the orders of the fields may be implemented. Other configurations apparent to one with ordinary skill in the art may be implemented.

Figure 6:
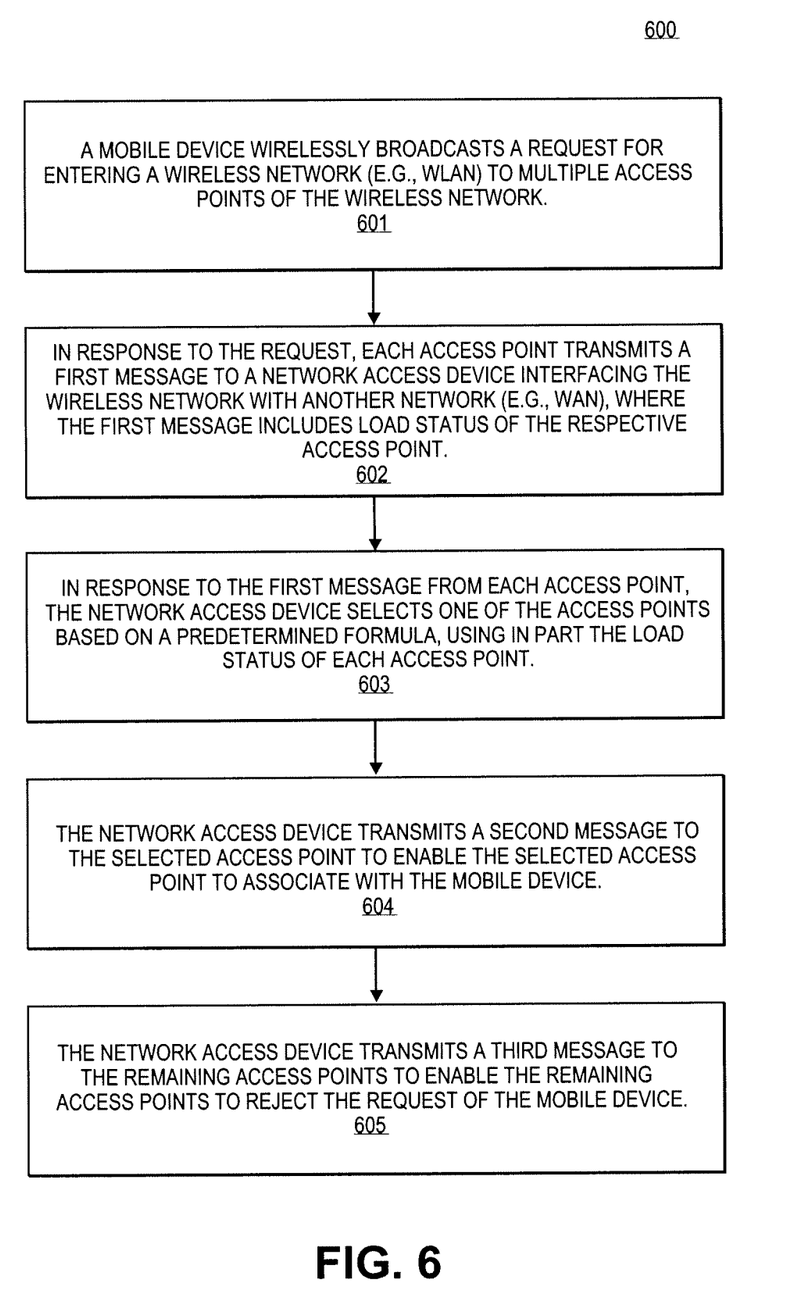
FIG. 6 is a flow diagram illustrating an exemplary process for associating a wireless station with an access point, according to one embodiment.

FIG. 6 is a flow diagram illustrating an exemplary process for associating a wireless station with an access point, according to one embodiment. The exemplary process 600 may be performed by processing logic that may include hardware (e.g., circuitry, dedicated logic, etc.), software (such as is run on a general-purpose computer system, a server, a router, or a dedicated machine), or a combination of both. In one embodiment, the exemplary process 600 includes, but is not limited to, in response to a request for entering a wireless network from a wireless station and forwarded from a plurality of access points (APs), a network access device coupled to the plurality of APs determining a load for each of the APs, and the network access device selecting one of the APs based on the determined loads of the APs to associate with the wireless station, whiling causing a remainder of the APs to reject the request.

Referring to FIG. 6, at block 601, a mobile device wirelessly broadcasts a request for entering (e.g., association or re-association situations) a wireless network (e.g., WLAN) to multiple access points of the wireless network. In one embodiment, the broadcasted request includes an RSSI between the mobile device and each of the multiple access points. In a particular embodiment, the broadcasted request is an IEEE 802.11 compatible probe request. In response to the broadcasted request, at block 602, each access point that receives the broadcast request transmits a first message to a network access device interfacing the wireless network with another network (e.g., WAN or Internet), where the first message includes load status of the respective access point. In one embodiment, the load status includes, but is not limited to, a number of mobile devices currently associated with the respective access point, an RSSI between the requesting mobile device and the respective access point, and/or an error rate (e.g., FER) of the respective access point.

In response to the first message received from each access point, at block 603, the network access device selects one of the access points based on a predetermined formula, using in part the load status extracted from the first message. In one embodiment, the network access device determines a weight for each access point based on the number of mobile devices currently associated with the respective access point, an RSSI between the respective access point and the requesting mobile device, and/or FER of the respective access point. The weight represents the load for each access point, which may be calculated according to one or more formulas described above. In one embodiment, the network access device selects an access point having a weight that satisfies one or more predetermined categories (e.g., highest weight).

At block 604, the network access device transmits a second message to the selected access point to enable the selected access point to associate with the requesting mobile device. At block 605, the network access device transmits a third message to the remaining access points to enable the remaining access points to reject the request of the mobile device. In one embodiment, the second and third messages are transmitted via a WLBP protocol, similar to those shown in FIG. 5A, particularly, using the acknowledge field 516 to indicate whether the access point receiving the message should accept or reject the requesting mobile device.

In one embodiment, in response to the second message, the selected access point responds with a normal probe response message (e.g., IEEE 802.11 compatible probe response) to accept the request of the mobile device. In response to the third message, the remaining access points respond with a probe response message having one or more bits inverted (e.g., inverted privacy bit 403 of an IEEE 802.11 probe response 400 of FIGS. 4A-4C) as an indication to reject the request of the mobile device. Other operations may also be performed.

Figure 7:
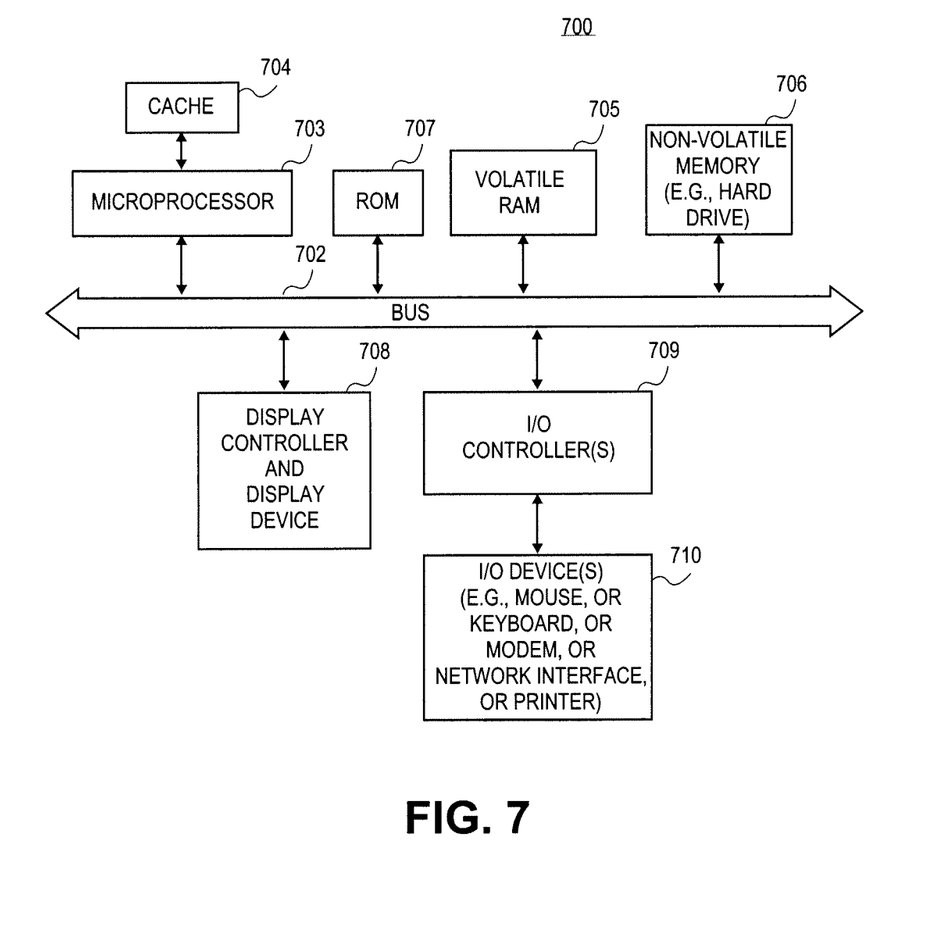
FIG. 7 is a block diagram of a digital processing system which may be used with one embodiment of the invention.

FIG. 7 is a block diagram of a digital processing system which may be used with one embodiment of the invention. For example, the exemplary system 700 shown in FIG. 7 may be used as a client computer system such as clients 108-117 of FIG. 1. Alternatively, the exemplary system 700 may be implemented as a network access device such as network access device 101 of FIG. 1. Furthermore, exemplary system 700 may be implemented as an access point such as access points 105-107 of FIG. 1.

Note that while FIG. 7 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. For example, when the exemplary system 700 is implemented as an access point or a network access device, display controller and display device 708 may be optional. IO devices 710 may include a wired network interface and/or wireless network interface.

As shown in FIG. 7, the computer system 700, which is a form of a data processing system, includes a bus or interconnect 702 which is coupled to a microprocessor 703 and a ROM 707, a volatile RAM 705, and a non-volatile memory 706. The microprocessor 703 is coupled to cache memory 704 as shown in the example of FIG. 7. The bus 702 interconnects these various components together and also interconnects these components 703, 707, 705, and 706 to a display controller and display device 708, as well as to input/output (I/O) devices 710, which may be mice, keyboards, modems, network interfaces, printers, and other devices, which are well-known in the art.

Typically, the input/output devices 710 are coupled to the system through input/output controllers 709. The volatile RAM 705 is typically implemented as dynamic RAM (DRAM) which requires power continuously in order to refresh or maintain the data in the memory. The non-volatile memory 706 is typically a magnetic hard drive, a magnetic optical drive, an optical drive, or a DVD RAM or other type of memory system, which maintains data even after power, is removed from the system. Typically the non-volatile memory will also be a random access memory, although this is not required.

While FIG. 7 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 702 may include one or more buses connected to each other through various bridges, controllers, and/or adapters, as is well-known in the art. In one embodiment, the I/O controller 709 includes a USB (Universal Serial Bus) adapter for controlling USB peripherals. Alternatively, I/O controller 709 may include an IEEE-1394 adapter, also known as FireWire adapter, for controlling FireWire devices. Other components may be included.

Thus, a centralized wireless LAN load balancing mechanism has been described herein. Some portions of the preceding detailed descriptions have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method operations. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable storage medium includes read only memory ("ROM"); random access memory ("RAM"); magnetic disk storage media; optical storage media; flash memory devices; whereas a machine-readable transmission medium includes electrical, optical, acoustical or other form of propagated signals (e.g., carrier waves, infrared signals, digital signals, etc.); etc.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for load balancing a wireless area network, the method comprising:
   receiving load data from a plurality of access points, each of the access points having received an entry request from a wireless client; and
   executing instructions stored in memory, wherein execution of the instructions by a processor:
      calculates a weighted load value for each access point by inputting the load data for each access point into a load balancing algorithm, wherein the load balancing algorithm includes the following variables:
a variance of a mean received signal strength indication (RSSI) of the access point, the variance considering the mean RSSI both with and without the wireless client taken into account, and
a quotient comparing the mean RSSI of the access point with the wireless client taken into account to the maximum possible RSSI for the access point;
compares the weighted load values of the access points to one another; and
selects one access point from among the plurality of access points to accept the entry request from the wireless client according to a predetermined category, wherein the predetermined category is based on the comparison of the weighted load values.

2. The method of claim 1, wherein the load data for each access point is received at a network access device communicatively coupled to the access points and the load data indicates one or more of the following:
a quantity of wireless clients connected to the access point, and
an RSSI between the access point and the wireless client.

3. The method of claim 2, wherein the network access device is a gateway device interfacing the wireless area network with another network.

4. The method of claim 2, wherein the load balancing algorithm further includes a variable corresponding to a frame error rate (FER) of the access point.

5. The method of claim 4, wherein the load data for each access point further indicates the FER of the access point.

6. The method of claim 5, wherein the processor further instructs the selected access point to accept the entry request from the wireless client.

7. The method of claim 6, wherein the processor further instructs each of the non-selected access points to affirmatively reject the entry request from the wireless client by sending a probe response.

8. The method of claim 7, wherein the request received from the wireless client is an IEEE 802.11 compatible probe request message, the selected access point responds with an IEEE 802.11 compatible probe response message to accept the probe request, and the non-selected access points respond with an IEEE 802.11 compatible probe response message having one or more predetermined bits altered to reject the probe request.

9. The method of claim 8, wherein the IEEE 802.11 compatible probe response message having the one or more altered predetermined bits indicates that the request has been rejected by access point, and the IEEE 802.11 compatible probe response message sent by the selected access point has one or more unaltered predetermined bits that indicates the request has been accepted by the access point.

10. The method of claim 7, wherein the probe response is an IEEE 802.11 compatible probe response message having a privacy bit inverted.

11. A wireless area network load balancing system, the system comprising:
a network access device; and
a plurality of access points that receive a request from a wireless client to enter a wireless network that includes the access points, the access points communicatively coupled to the network access device through the wireless network, wherein the network access device balances the overall load on the wireless area network by:
receiving load data from each of the access points, the load data indicating a received signal strength indication (RSSI) between the access point and the wireless client and either of:
a quantity of wireless clients connected to the access point, and
a frame error rate (FER) of the access point; and
executing instructions stored in memory, wherein execution of the instructions by a processor:
calculates a weighted load value for each of the access points by inputting the load data for each access point into a balancing algorithm, wherein the balancing algorithm includes a variance of a mean RSSI of the access point, the variance considering the mean RSSI both with and without the wireless client taken into account, and one or more of the following variables:
a quotient comparing the mean RSSI of the access point with the wireless client taken into account to the maximum possible RSSI for the access point, and
the FER of the access point when the received load data includes the FER of the access point;
compares the weighted load values of the access points to one another;
selects one access point from among the plurality of access points to accept the entry request from the wireless client according to a predetermined category, wherein the predetermined category is based on the comparison of the weighted load values;
instructs the selected access point to accept the entry request from the wireless client; and
instructs each of the non-selected access points to reject the entry request from the wireless client.

12. A method for load balancing a wireless area network, the method comprising:
receiving load data from a plurality of access points in the wireless area network each access point having received an entry request from a wireless client, the load data for each access point received at a network access device communicatively coupled to the access points and indicating a received signal strength indication (RSSI) between the access point and the wireless client and either of:
a quantity of wireless clients connected to the access point, and
a frame error rate (FER) of the access point; and
executing instructions stored in memory, wherein execution of the instructions by a processor:
calculates a weighted load value for each of the access points by inputting the load data for each access point into a balancing algorithm, wherein the balancing algorithm includes a variance of a mean RSSI of the access point, the variance considering the mean RSSI both with and without the wireless client taken into account, and one or more of the following variables:
a quotient comparing the mean RSSI of the access point with the wireless client taken into account to the maximum possible RSSI for the access point, and
the FER of the access point when the received load data includes the FER of the access point;
compares the weighted load values of the access points to one another;
selects one access point from among the plurality of access points to accept the entry request from the wireless client according to a predetermined category, wherein the predetermined category is based on the comparison of the weighted load values;

instructs the selected access point to accept the entry request from the wireless client; and instructs each of the non-selected access points to reject the entry request from the wireless client.

13. A method for load balancing a wireless area network, the method comprising:

receiving load data from a plurality of access points in the wireless area network, each access point having received an entry request from a wireless client, the load data for each access point received at a network access device communicatively coupled to the access points and indicating:

a frame error rate (FER) of the access point, a quantity of wireless clients connected to the access point, and a received signal strength indication (RSSI) between the access point and the wireless client; and executing instructions stored in memory, wherein execution of the instructions by a processor:

calculates a weighted load value for each of the access points by inputting the load data for each access point into a balancing algorithm, wherein the balancing algorithm includes the following variables:

a variance of a mean RSSI of the access point, the variance considering the mean RSSI both with and without the wireless client taken into account, a quotient comparing the mean RSSI of the access point with the wireless client taken into account to the maximum possible RSSI for the access point, and the FER of the access point;

compares the weighted load values of the access points to one another;

selects one access point from among the plurality of access points to accept the entry request from the wireless client according to a predetermined category, wherein the predetermined category is based on the comparison of the weighted load values;

instructs the selected access point to accept the entry request from the wireless client; and instructs each of the non-selected access points to reject the entry request from the wireless client.

14. A non-transitory machine-readable storage medium having embodied thereon executable code to cause a machine to perform a method for load balancing a wireless area network, the method comprising:

receiving load data from a plurality of access points in the wireless area network, each access point having received an entry request from a wireless client, the load data for each access point received at a network access device communicatively coupled to the access points and indicating:

a frame error rate (FER) of the access point, a quantity of wireless clients connected to the access point, and a received signal strength indication (RSSI) between the access point and the wireless client; and executing instructions stored in memory, wherein execution of the instructions by a processor:

calculates a weighted load value for each of the access points by inputting the load data for each access point into a balancing algorithm, wherein the balancing algorithm includes the following variables:

a variance of a mean RSSI of the access point, the variance considering the mean RSSI both with and without the wireless client taken into account, a quotient comparing the mean RSSI of the access point with the wireless client taken into account to the maximum possible RSSI for the access point, and the FER of the access point;

compares the weighted load values of the access points to one another;

selects one access point from among the plurality of access points to accept the entry request from the wireless client according to a predetermined category, wherein the predetermined category is based on the comparison of the weighted load values;

instructs the selected access point to accept the entry request from the wireless client; and instructs each of the non-selected access points to reject the entry request from the wireless client.

* * * * *